Nov. 20, 1923.
C. DUEKER
1,475,110
JOURNAL BEARING
Original Filed May 11, 1920
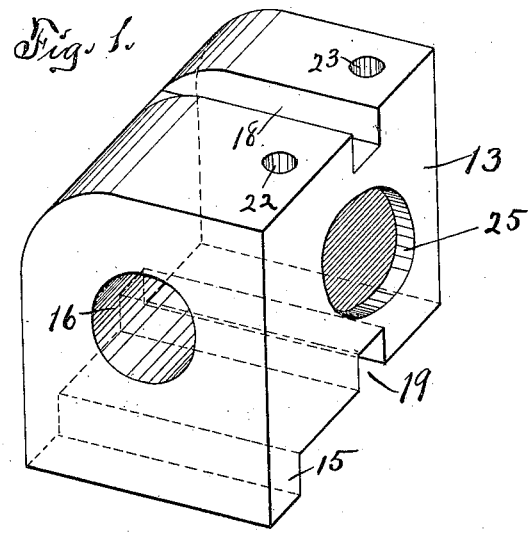
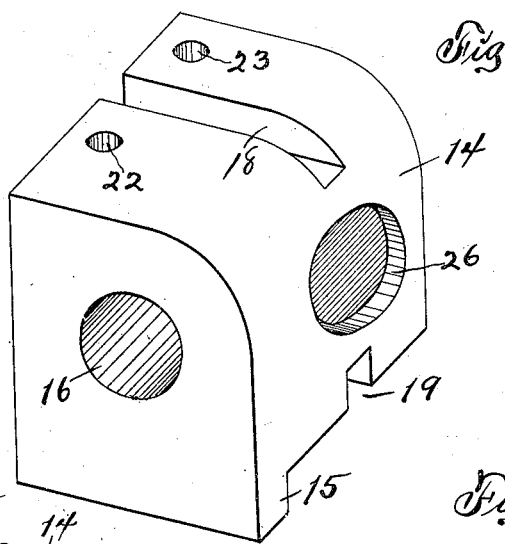
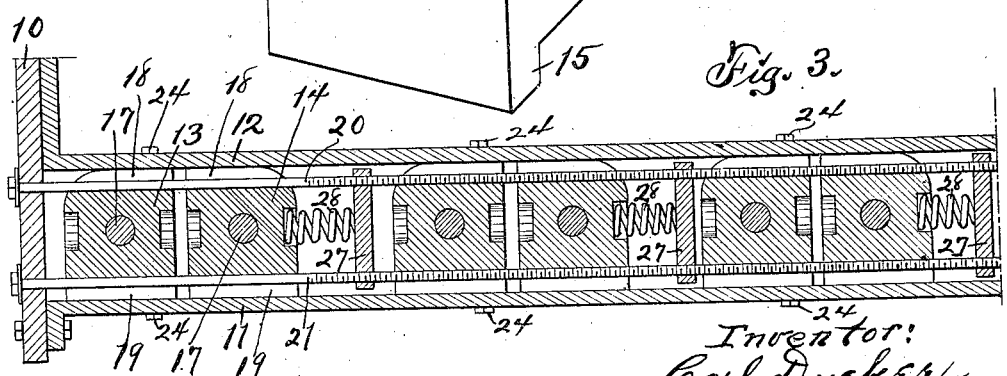
Inventor:
Carl Dueker.
By Silas LeSweet
Atty's Patented Nov. 20, 1923.

1,475,110

UNITED STATES PATENT OFFICE.

CARL DUEKER, OF COOPER TOWNSHIP, WEBSTER COUNTY, IOWA.

JOURNAL BEARING.

Original application filed May 11, 1920, Serial No. 380,544. Divided and this application filed April 4, 1921. Serial No. 458,214.

*To all whom it may concern:*

Be it known that I, CARL DUEKER, a citizen of the United States of America, and resident of Cooper Township, Webster County, Iowa, have invented a new and useful Journal Bearing, of which the following is a specification.

The object of this invention is to provide an improved construction for a journal bearing.

A further object of this invention is to provide an improved construction for a journal bearing adapted to be mounted for reciprocation.

A further object of this invention is to provide an improved construction for a journal bearing adapted to be mounted for reciprocation, spring-held in one direction and guided in its reciprocation.

A further object of this invention is to provide an improved construction for a journal bearing adapted to be mounted for reciprocation and guided in its reciprocation.

A further object of this invention is to provide an improved construction for a journal bearing adapted to be arranged in pairs, one of which is fixed and the other adapted for reciprocation, guided in its reciprocation and spring-held in one direction.

My invention consists in the construction, arrangement and combination of elements hereinafter set forth, pointed out in my claim and illustrated by the accompanying drawing, in which—

Figure 1 is a perspective of one of a pair of journal bearings. Figure 2 is a perspective of the other of a pair of journal bearings. Figure 3 is a cross-section illustrating the journal bearings mounted in pairs, means for reciprocating one bearing of each pair, means for guiding the reciprocable bearing, and means for spring-pressing the reciprocable bearing toward the other in each pair.

This invention relates to and is divided out of my application for Letters Patent of the United States Number 380,544, filed May 11, 1920.

In the construction and mounting of the devices as shown the numeral 10 designates one of a pair of supports (the other not being shown) adapted to be mounted in parallel relation and spaced apart. Primarily the supports 10 are parts of the frame of a corn husking machine and the bearings hereinafter described are used for rotatable mounting of end portions of husking rollers; but the same journal bearing and general arrangement of parts may be utilized in different structures and I do not desire to be understood as limiting myself to the precise use herein set forth and illustrated and described in my parent application above referred to.

A base bar 11 is arranged transversely of, fixed to and connects the supports 10 and a cap bar 12 is arranged transversely of, fixed to and connects the supports 10 above, parallel with and spaced from the base bar 11. A plurality of journal bearings are mounted between the base bar 11 and cap bar 12, resting on the former and confined by the latter against vertical movement, and said bearings preferably are arranged in pairs in such locations. The journal bearings are alike in form, size and construction and are usable interchangeably save and except that the bearings of each pair preferably are right and left respectively because of a peculiarity of construction hereinafter pointed out, which contributes to stability of mounting. The right and left journal bearings (Figures 2 and 1) are designated generally by the numerals 13, 14. Each bearing 13 or 14 is formed of a single piece of metal preferably by molding or casting and is of a width slightly greater than that of the base bar 11, a flange 15 being formed on one edge and adapted to overlap and engage a side margin of said base bar. It is the function of the flange 15 to guide a movable bearing block in reciprocation relative to the base bar 11 and prevent twisting of said block on said bar. Therefore, one of the blocks 13, 14 has the flange on one bottom edge thereof while the other of said blocks has the flange on the opposite bottom edge thereof and, when the two blocks are mounted in juxtaposition on the bar 11 said flanges are in alinement and contact with the same side margin of said bar. Each of the bearing blocks 13, 14 is formed with a centrally located horizontal hole 16 adapted to receive and journal a shaft 17. Each of the bearing blocks 13, 14 is formed also with transverse grooves 18, 19 in its upper and lower face respectively. The grooves 18, 19 are in the same vertical plane and are on opposite sides of and extend at right angles to the hole 16. Adjusting bolts 20, 21 are mounted for rotation in the supports 10 between the bars 11, 12 and extend loosely through the grooves 18, 19 respectively of successive bearing blocks arranged between said bars. The adjusting bolts 20, 21 have some influence and effect in guiding and holding movable bearing blocks between the bars. The bearing blocks 13, 14 also are formed with vertical bolt holes 22, 23 extending therethrough on opposite sides of and at right angles to the grooves 18, 19 and at one side of and at right angles to the hole 16. One bearing block of each pair, in this instance 13, is secured rigidly yet detachably to the bars 11, 12 by bolts 24 mounted in the holes 22, 23 and extending through registering holes in said bars. The other bearing block of each pair, in this instance 14, is loosely mounted between the bars, there being no bolts in the holes 22, 23 thereof. Each of the bearing blocks 13, 14 also is formed with depressions, cavities or seats 25, 26 in opposite vertical faces between end portions of the grooves 18, 19 and extending as to depth parallel with said grooves. Bar washers 27 are threaded on the adjusting bolts 20, 21 and extend between them. The bar washers 27 also are contained between and independent of the bars 11, 12. The bar washers also are contained between a movable bearing block 14 of one pair and a fixed bearing block 13 of another pair and an expansive coil spring 28 is interposed between each of the movable bearing blocks and an adjacent washer and impinges at its ends thereon, one end portion of each spring being received in a seat or depression 25, 26 for location thereof relative to the bearing block. It will be understood that the bearing blocks 13, 14 may be selectively employed and the springs may be selectively applied to them and also selectively applied to opposite sides thereof. For instance, the bearing blocks may be mounted as shown or they may be mounted in reversed relative positions. When assembled as shown the fixed bearing blocks support the shafts journaled therein in stationary positions and the movable bearing blocks support the shafts journaled therein in movable relation to the other shafts, thus providing means for automatic separation of the shafts under yielding pressure of the springs backing the movable blocks, under the strain of a load tending to separate the shafts of a pair.

I claim as my invention—

The combination with a suitable support, parallel bars carried by said support and threaded rods loosely mounted in said support and extending between and parallel with said bars, of a plurality of bearing members mounted side by side between said bars, some of said members being fixed, the others being movable in the same plane therewith, each bearing member being formed with grooves adapted to receive said rods loosely, and also formed with spring-end seats, bar washers formed with screw-seats threading on said rods, each washer being located between a movable and a fixed bearing member and spaced from both and adapted to be adjusted by said rods to and fro relative to said fixed member, and expansive coil springs interposed between and impinging at opposite ends on the washers and movable members, one end of each of said springs entering one of said seats.

Signed at Des Moines, in the county of Polk and State of Iowa, this 10th day of March, 1921.

CARL DUEKER.